Oct. 21, 1958

J. F. ZALESKI 2,857,575

MICROWAVE ENERGY ORIENTER

Filed June 22, 1953

INVENTOR.
JOHN F. ZALESKI
BY
*H. L. Mosley*
ATTORNEY

Oct. 21, 1958

J. F. ZALESKI 2,857,575

MICROWAVE ENERGY ORIENTER

Filed June 22, 1953

INVENTOR.
JOHN F. ZALESKI
BY
*H. A. Mackey*
ATTORNEY

United States Patent Office 2,857,575
Patented Oct. 21, 1958

2,857,575

MICROWAVE ENERGY ORIENTER

John F. Zaleski, Thornwood, N. Y., assignor to General Precision Laboratory Incorporated, a corporation of New York Application June 22, 1953, Serial No. 363,241

11 Claims. (Cl. 333—17)

This invention relates to an apparatus for establishing and maintaining a predetermined plane of polarization of microwave energy being propagated in a circular waveguide. Nearly all microwave detectors and utilization devices are inherently polarized devices and require the E vector to have a definite fixed polarization for efficient excitation. A rectangular waveguide is usually preferred to a circular guide for transmitting microwave energy principally because energy introduced in the dominant mode retains its plane of polarization and arrives at the receiving end with its E vector definitely oriented. If a circular guide is excited in the dominant $TE_{11}$ mode, minor inaccuracies and discontinuities tend to rotate the plane of polarization in a random manner so that energy may arrive at the receiving end of the guide with any plane of polarization. The plane of polarization may also vary from time to time. A circular guide could be used to advantage in many applications if this disadvantage could be overcome since a circular guide is cheaper to manufacture and affords lower attenuation than rectangular guide.

It is an object of this invention to provide an apparatus for sensing the plane of polarization of microwave energy in a circular waveguide.

Another object of the invention is to provide an apparatus which will accept microwave energy having any plane of polarization and deliver the energy in the form of a wave having a predetermined polarization.

Another object of the invention is to provide an apparatus for transmitting microwave energy efficiently from a circular waveguide to a rectangular waveguide regardless of the plane of polarization of the wave in the circular guide.

Another object of the invention is to provide an apparatus for establishing and maintaining constant the plane of polarization of a $TE_{11}$ wave in a circular guide.

Another object of the invention is to provide an apparatus for rotating the plane of polarization of microwave energy within a circular waveguide to a predetermined plane.

A preferred embodiment of the invention comprises a ferro-magnetic polarization rotator and a short section of circular waveguide joined in that order to the receiving end of a circular waveguide transmission path. Two crystal diode probes or coupling loops are mounted on the periphery of the section of circular guide in the same transverse plane but angularly spaced from each other and projecting into the interior of the guide. A comparison of the voltages induced in the two probes yields an indication of the polarization of the wave energy within the guide. These voltages are fed to a circuit which makes this comparison and applies a voltage to the winding of the polarization rotator of the proper polarity and magnitude to rotate the plane of polarization until the voltage induced in the two probes is equal. The wave then has a definite plane of polarization and can be utilized efficiently by any appropriate microwave apparatus.

For a more complete understanding of the invention, reference may be made to the accompanying drawing in which.

Figure 1:
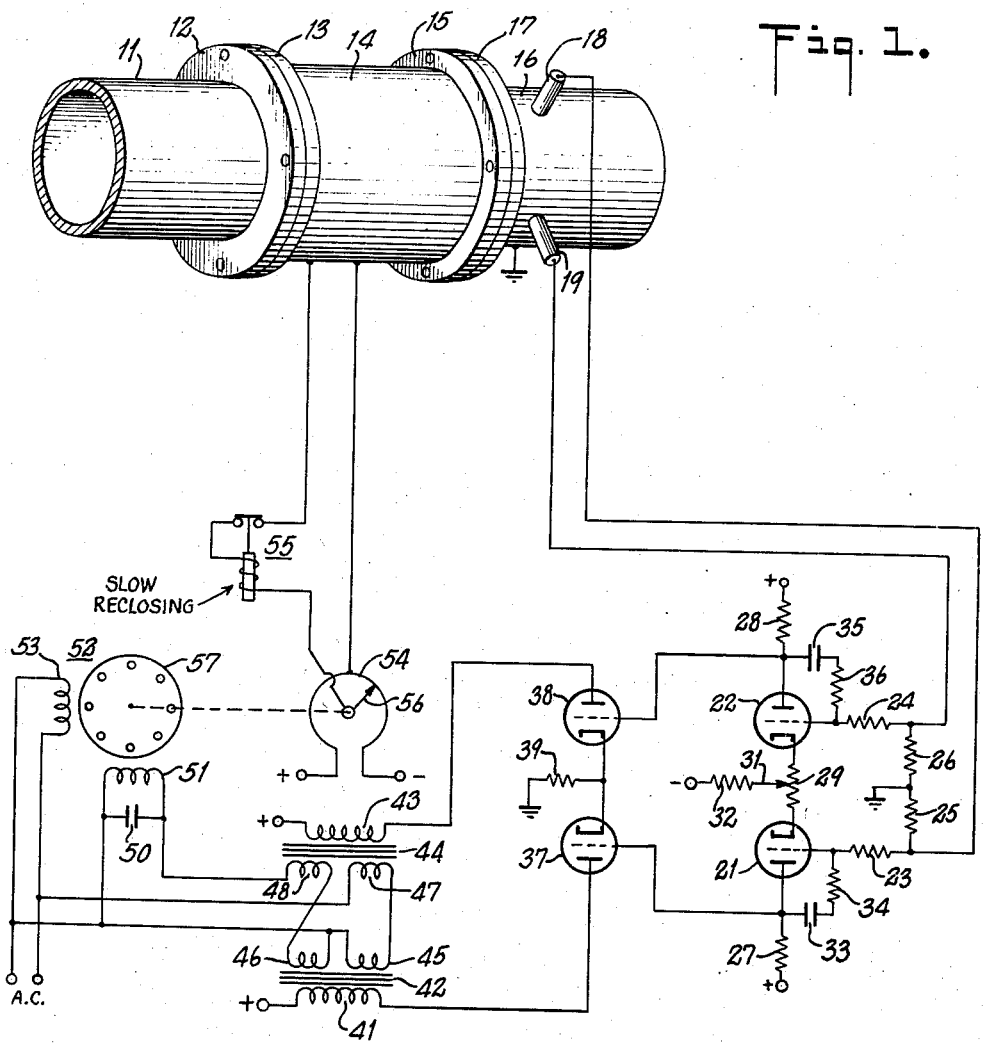
Figure 1 is a diagram of the invention, partially pictorial and partially schematic.

Referring now to Fig. 1, there is shown a circular input waveguide 11 which may be the receiving end of a microwave transmission path. Coupled to the waveguide 11 by flanges 12 and 13 is a ferromagnetic polarization rotator 14.

Figure 3:
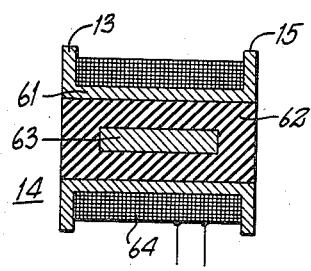
Figure 3 is a cross sectional view of the polarization rotator employed in the embodiment of Figure 1.

As best shown in Fig. 3, rotator 14 may comprise a cylindrical metal sleeve 61 with integral flanges 13 and 15 for joining the rotator to other microwave components. The space within the cylindrical sleeve is filled with a low loss dielectric material 62, such as a tetrafluoroethylene resin sold under the trade mark "Teflon." Embedded in the center of the dielectric material on the axis of the sleeve is a ferrite rod 63. This rod may be made of a material known as Ferramic "D" which may be obtained from the General Ceramics and Steatite Corporation, Keasbey, New Jersey. Between the flanges 13 and 15 an energizing winding 64 is wound in order to provide a magnetic field through the ferrite rod along the axis of the cylindrical sleeve. The details of the polarization rotator are not a part of the present invention, but one type has been described so that the invention may be more readily understood. One type of rotator which has been found to be satisfactory may be obtained commercially from C. H. Luhrs and Co., Hackensack, New Jersey, and is known as a "Faratron." Such a polarization rotator is capable of rotating the plane of polarization of a wave by any amount up to more than 90° in either direction when suitably energized.

An output section of circular waveguide 16 is joined to the polarization rotator 14 by flanges 15 and 17. Mounted on the surface of guide 16 are two field sensitive elements, or microwave detectors, 18 and 19 which may be any of several well known types. In a preferred embodiment, each detector comprises a short section of coaxial line having the outer conductor terminated at and joined to the waveguide 16. A small rectifier, such as a crystal, is placed within the coaxial line in series with the inner conductor. The inner conductor is extended so as to project into the internal of the guide 16 and is formed into a loop, the end of which is connected to the outer conductor. If desired, the detectors 18 and 19 may each comprise a probe projecting into the waveguide 16 together with a suitable rectifier and tuning stub. In either case, each of the elements 18 and 19 will produce a direct voltage the magnitude of which depends upon the plane of polarization of the wave within the guide 16.

The elements 18 and 19 are located in the same plane transverse to the axis of the guide 16, are angularly spaced apart, preferably by 90°, and make equal angles with the desired direction of the E vector of the wave within the guide 16.

Figure 2:
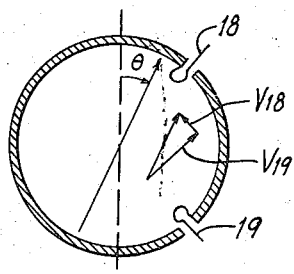
Figure 2 is schematic representation of a cross section of the output waveguide, useful in explaining the operation of the invention.

The manner in which the two elements 18 and 19 produce a signal indicative of the polarization of the wave in guide 16 can best be understood by reference to Fig. 2, which is a schematic representation of a cross section of the guide 16 through the elements 18 and 19. Assume that it is desired to adjust the polarization so that the E vector is vertical as viewed in Fig. 2. Let us designate the direction of polarization at any time by the angle θ and the voltages induced in elements 18 and 19 by $V_{18}$ and $V_{19}$ respectively. Let us consider how these voltages vary as θ varies. If we regard the maximum induced voltage as unity, then when θ is zero, $V_{18}=V_{19}$ and each is equal to approximately 0.7. As θ increases positively, $V_{18}$ decreases and $V_{19}$ increases until when θ=45°, $V_{18}=0$ and $V_{19}=1.0$. As θ increases further, $V_{18}$ increases and $V_{19}$ decreases until when θ=90°, $V_{18}=V_{19}=0.7$. As θ increases beyond 90°, $V_{18}$ increases further while $V_{19}$ decreases. A similar but opposite effect occurs when θ becomes negative. When θ is between 0° and plus 90°, the E vector should be rotated counterclockwise, while when θ is between 0 and —90°, the rotation should be counterclockwise. These observations are tabulated in Table I below.

Table I

| θ | −135° (+45°) | −90° | −45° | 0° | +45° | +90° | +135° (−45°) |
|---|---|---|---|---|---|---|---|
| $V_{18}$ | 0 | .7 | 1 | .7 | 0 | .7 | 1 |
| $V_{19}$ | 1 | .7 | 0 | .7 | 1 | .7 | 0 |
| Relative Values of $V_{18}$ and $V_{19}$ | $V_{19}>V_{18}$ | | $V_{18}>V_{19}$ | | $V_{19}>V_{18}$ | | $V_{18}>V_{19}$ |
| Direction of Rotation of Polarization Required | CCW | | CW | | CCW | | CW |

The apparatus for securing the desired polarization correction may take many forms, one of which is illustrated in Fig. 1. The voltages from the elements 18 and 19 are applied to the grids of two electron tubes 21 and 22 through resistors 23 and 24 respectively. The grids of tubes 21 and 22 are returned to ground through resistors 25 and 26. Anode potential is supplied through load resistors 27 and 28. The cathodes of tubes 21 and 22 are connected together through a potentiometer 29, the slider 31 of which is connected through a resistor 32 to a source of negative voltage. The anode and grid of tube 21 are connected together through the series combination of capacitor 33 and resistor 34, while the anode and grid of tube 22 are connected by a similar circuit comprising capacitor 35 and resistor 36. These two resistor-capacitor networks are included to minimize the effects of modulation of the wave in waveguide 16 on the operation of the polarization correcting circuits.

The anodes of tubes 21 and 22 are directly connected to the grids of tubes 37 and 38 respectively, the cathodes of which are joined together and returned to ground through a resistor 39. The anode of tube 37 is connected to a source of positive voltage through a control winding 41 of a saturable transformer 42, while the anode of tube 38 is connected to a source of positive voltage through a control winding 43 of another saturable transformer 44. Transformer 42 comprises the previously mentioned control winding, a primary winding 45 and a secondary winding 46. The transformer 44 comprises a control winding 43, a primary winding 47 and secondary winding 48. The primary windings 45 and 47 are connected in series to a source of alternating current. The secondary windings 46 and 48 are connected in series with each other and in series with a winding 51 of a two phase motor indicated generally by the reference character 52. A capacitor 50 is shunted across winding 51. The other winding 53 of the motor 52 is connected to the same source of alternating current to which windings 45 and 47 are connected.

One terminal of the energizing winding of polarization rotator 14 is connected to the midpoint of potentiometer 54, the opposite ends of which are connected to a source of direct voltage. The other terminal of the winding of the polarization rotator 14 is connected through an overload relay 55 to the slider 56 of the potentiometer 54. The slider 56 is mechanically connected to the armature 57 of the motor 52.

To describe the operation, let us assume that the E vector of the wave in guides 11 and 16 makes a positive acute angle θ with the vertical as indicated in Figure 2. Let it also be assumed that the slider 56 of the potentiometer 54 is at its middle position. Under these conditions, $V_{19}$ will be greater than $V_{18}$ and therefore tube 22 will conduct more than tube 21. Therefore, the anode potential of tube 21 will be greater than that of the anode of tube 22 and this greater potential causes tube 37 to conduct more than tube 38. The increase in current through the control winding 41 with respect to the control winding 43 will cause the two phase motor 52 to rotate and to adjust the slider 56 of potentiometer 54. The various polarities and directions of rotation must be selected so that this rotation of the slider 56 will energize the winding of the rotator 14 with such a polarity as to rotate the E vector of the wave in a counterclockwise direction as indicated in Table I. The motor 52 will continue to rotate until the E vector has been brought to the vertical position at which time the voltages produced by detectors 18 and 19 will be equal. The above sequence of operations will take place whenever the E vector in waveguide 16 makes a positive angle of less than 90° with the vertical. A similar, but opposite, sequence will take place if the angle θ is between zero and minus 90°.

When setting up the apparatus, the slider 31 of potentiometer 29 is adjusted so that with no signal coming from the detectors 18 and 19, the motor 52 remains at rest.

Reference to Figure 2 will show that, if θ equals either plus 90° or minus 90°, the voltage outputs of detectors 18 and 19 are equal. It might appear that the plane of polarization might come to rest at one of these positions. However, reference to Table I will show that these two positions represent points of unstable equilibrium. If θ equals plus 90° the voltages of detectors 18 and 19 are equal, but if θ increases even slightly motor 52 will operate to rotate the plane of polarization in a clockwise direction away from the 90° position. Similarly if θ decreases slightly, the mechanism will rotate the plane of polarization counterclockwise, which is also away from the 90° position.

The overload relay 55, while affording the usual protection against excessive currents serves an additional purpose. It is possible that the plane of polarization of the wave in guide 11 could continuously rotate. Let us suppose that the plane of polarization of the wave in guide 11 is at some positive acute angle with the vertical. The apparatus will rotate this plane so that the E vector in guide 16 is vertical. If the plane of polarization in guide 11 continues to rotate in the same direction, it will reach a point where the rotator is no longer able to restore the polarization to the vertical position. The relay 55 is adjusted so as to open when the current through the winding of rotator 14 reaches that amount which is sufficient to rotate the plane of polarization by approximately 95°. When this happens the plane of polarization in guide 16 will suddenly revert to the plane of the wave in guide 11 and $V_{19}$ instead of being greater than $V_{18}$ will now be less than $V_{18}$ and the motor 52 will run in the opposite direction. The relay 55 should be adjusted so as to maintain its contacts open for a time slightly longer than that required for the motor to rotate the slider 56 from one of its extreme positions to its median position. When the relay recloses, the apparatus will resume normal operation.

Figure 4:
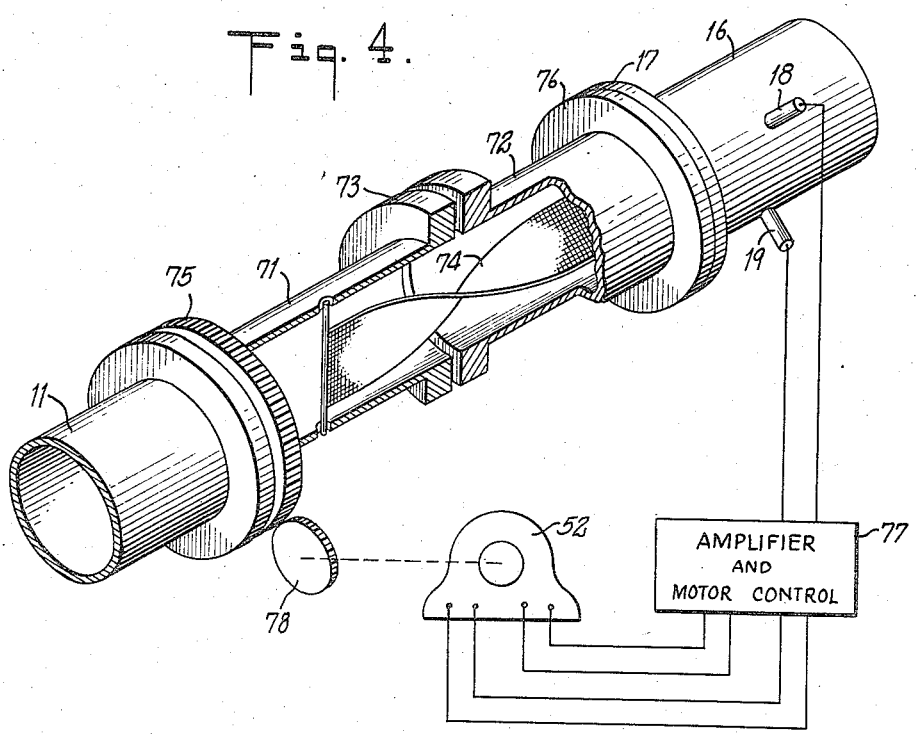
Figure 4 illustrates the use of another form of polarization rotator in the invention.

A mechanical polarization rotator may be used in place of the ferromagnetic rotator previously described. As shown in Fig. 4, such a rotator may comprise a first section of circular waveguide 71 and a second section of circular waveguide 72 joined coaxially by means of a rotatable joint 73. Within the two guides and on their common axis is placed a flexible conductive septum 74.

One end of the septum 74 is secured by means of a rod to waveguide 71 while the other end of septum 74 is secured to waveguide 72. If a $TE_{11}$ wave is impressed upon waveguide 71 with its E vector perpendicular to the plane of septum 74 at its end, the wave will emerge from waveguide 72 with its plane of polarization rotated by an amount depending upon the relative rotation of guides 71 and 72. For a more complete description of the polarization rotator just described, reference may be made to Patent No. 2,628,278 of John F. Zaleski, issued February 10, 1953.

As used in the present invention the input waveguide 11 may be connected to the polarization rotator by means of a rotatable joint 75. The output waveguide 16 is connected to the other end of the polarization rotator by any suitable rigid joint, shown in Fig. 4 as comprising flanges 76 and 17. As in the modification of Fig. 1, the waveguide 16 is provided with two sensing elements, or detectors 18 and 19 the outputs of which are connected to an amplifier and motor control system 77. This amplifier and motor control system may be the same as that shown in Fig. 1. However, the motor 52, instead of rotating the slider of a potentiometer, is mechanically connected to a disk 78 which bears upon an element of the rotatable joint 75.

The operation of this embodiment is similar to that previously described in connection with Fig. 1. Whenever the outputs of detectors 18 and 19 are unequal the motor 52 will rotate guide 71 with respect to guide 72 until the polarization in waveguide 16 is such as to produce equal voltage outputs from detectors 18 and 19.

The apparatus has been described as making the stable plane of polarization vertical as shown in Fig. 2. It can be seen by reference to Table I that the horizontal plane can be made the stable plane by reversing the direction of rotation of the plane of polarization with respect to the signals from detectors 18 and 19.

No device for utilizing the stabilized wave energy in waveguide 16 has been shown. If desired, a utilization device can be joined directly to waveguide 16 or the wave energy can be transferred to rectangular guide by means of any well known tapered transition or transformer section. Since the polarization is definitely fixed, the utilization device can be oriented to secure efficient transfer of energy.

The apparatus has been described with respect to two embodiments. However, many modifications may be made within the scope of the invention. For example, Fig. 2 shows the use of loops as detectros . As previously pointed out, it would be possible to use probes in which case the stable plane of polarization would be shifted by 90° provided all other connections remained the same. Many other types of follow up systems could be connected between the detectors 18 and 19 and the energizing winding of polarization rotator 14. For example, the signals from detectors 18 and 19 could be converted to A. C. by a "chopper" and fed to an A. C. amplifier. Instead of using a two phase motor, one could use a D. C. motor. Any type of electrically controlled polarization rotator could be used instead of the two specific types described. Instead of using a motor in the embodiment of Fig. 1, an all electronic energization system could be employed. Many other modifications will occur to those skilled in the art.

What is claimed is:

1. Apparatus for receiving wave energy having a random plane of polarization and delivering the energy polarized in a predetermined plane comprising, means for rotating the plane of polarization of incident energy comprising an electrically controlled polarization rotator, means for coupling wave energy to said polarization rotator, output coupling means for receiving wave energy from said polarization rotator, means for sensing the deviation of the polarization of the energy in said output coupling means from said predetermined plane and means responsive to said sensing means for controlling said polarization rotator to eliminate said deviation.

2. Apparatus for stabilizing the plane of polarization of wave energy within a circular waveguide comprising, a circular input waveguide for propagating the wave energy the plane of polarization of which is to be stabilized, a circular output waveguide for receiving the stabilized wave, means for rotating the plane of polarization of wave energy as it passes from said input waveguide to said output waveguide comprising an electromagnetic polarization rotator coupled to said input and output waveguides, sensing means within said output waveguide for sensing the plane of polarization of wive energy, and means responsive to said sensing means for controlling the energization of said polarization rotator to maintain constant the plane of polarization of the energy in said output waveguide.

3. Apparatus for establishing a predetermined plane of polarization of microwave energy received from a circular waveguide comprising, means for rotating the plane of polarization of microwave energy received from said waveguide comprising an electrically controlled polarization rotator coupled to said waveguide, an output section of circular waveguide coupled to said polarization rotator, means for producing voltages varying according to the polarization of the wave energy within said output section, said last named means comprising two elements projecting within said output section, and means responsive to the voltages produced by said elements for adjusting said polarization rotator until the voltages produced by said two elements are equal.

4. Apparatus for receiving microwave energy having any plane of polarization and delivering the energy with a predetermined plane of polarization comprising, a circular input waveguide adapted to propagate microwave energy having any plane of polarization, means for rotating the plane of polarization of energy received from said input waveguide comprising a ferromagnetic polarization rotator, including a control winding, coupled to said input waveguide, a circular output waveguide coupled to said polarization rotator, means for producing direct voltages which vary with the plane of polarization of the energy within said output guide, said last named means comprising two elements projecting into the interior of said output waveguide, and means responsive to said voltages for controlling the energization of said control winding to make said voltages equal.

5. Apparatus according to claim 4 further comprising a relay having its coil and its normally closed contacts both in series with said winding.

6. Apparatus for establishing a predetermined plane of polarization of microwave energy received from a circular waveguide comprising, means for rotating the plane of polarization received from said waveguide comprising a ferromagnetic polarization rotator including a control winding, means for coupling said polarization rotator to said waveguide, a circular output wave guide coupled to said polarization rotator, means for producing voltages varying with the polarization of the wave energy within said output waveguide, said last named means comprising two elements projecting into said output waveguide in the same transverse plane, a source of direct voltage, controllable in magnitude and polarity, for energizing said polarization rotator, and means responsive to the voltage produced by said elements for controlling said source of direct voltage to maintain the energy in said output waveguide polarized in said predetermined plane.

7. Apparatus for maintaining constant the plane of polarization of microwave energy within a circular waveguide comprising, a circular input waveguide for receiving microwave energy, a circular output waveguide, means for rotating the plane of polarization of microwave energy transmitted from said input waveguide to said output waveguide comprising a ferromagnetic polarization rotator, including an energizing winding, coupling said waveguides together, means for producing direct voltages which vary with the plane of polarization of the energy within said output waveguide, said last named means comprising two field responsive elements projecting into the interior of said output waveguide, said elements being located in the same transverse plane and angularly spaced substantially 90° apart, and means responsive to the direct voltages produced by said elements for adjusting the energization of said winding to maintain the direct voltages produced by said two field responsive elements equal.

8. Apparatus according to claim 7 further comprising, a slow reclosing relay having its coil and a set of normally closed contacts connected in series with each other and with said winding.

9. Apparatus for maintaining constant the plane of polarization of microwave energy within a circular waveguide comprising, a circular input waveguide for receiving microwave energy, a circular output waveguide, means for rotating the plane of polarization of microwave energy transmitted from said input waveguide to said output waveguide comprising a ferromagnetic polarization rotator, including an energizing winding, coupling said waveguides together, means for producing two direct voltages each of which varies with the plane of polarization of the energy within said output waveguide, said last named means comprising two elements projecting into the interior of said output waveguide in the same transverse plane, comparing means for comparing the magnitude of said voltages, and means responsive to said comparing means for controlling the energization of said winding to make said two direct voltages equal to each other.

10. Apparatus for stabilizing the plane of polarization of microwave energy within a circular waveguide comprising, a circular input waveguide for receiving the microwave energy the polarization of which is to be stabilized, a circular output waveguide for receiving the energy after its plane of polarization has been stabilized, means for rotating the plane of polarization of the microwave energy transmitted from said input waveguide to said output waveguide comprising a ferromagnetic polarization rotator, including a control winding, coupled to said input and output waveguides, means for producing two direct voltages each of which varies with the polarization of the energy within said output waveguide, said last named means comprising two field sensitive elements projecting into the interior of said output waveguide, said elements being in the same transverse plane and angularly spaced from each other by substantially 90°, a differential amplifier, means for connecting the output of said elements to the input of said amplifier, a controllable source of direct voltage for energizing said winding, and means responsive to the output of said amplifier for controlling the magnitude and polarity of said source of voltage so as to maintain equal the voltage outputs of said field sensitive elements.

11. Apparatus according to claim 10 further comprising, a slow reclosing overload relay the normally closed contacts and operating winding of which are connected in series withe each other and in series with said control winding.

References Cited in the file of this patent
UNITED STATES PATENTS

| | | |
|---|---|---|
| 2,257,783 | Bowen | Oct. 7, 1941 |
| 2,628,278 | Zaleski | Feb. 10, 1953 |
| 2,644,930 | Luhrs | July 7, 1953 |
| 2,773,245 | Goldstein et al. | Dec. 4, 1956 |

FOREIGN PATENTS

| | | |
|---|---|---|
| 511,649 | Belgium | June 14, 1952 |